(12) United States Patent
Johnson et al.

(10) Patent No.: US 10,514,027 B2
(45) Date of Patent: Dec. 24, 2019

(54) HIGH-PRESSURE TO LOW-PRESSURE CHANGEOVER VALVE FOR A POSITIVE DISPLACEMENT PUMP

(71) Applicant: Graco Minnesota Inc., Minneapolis, MN (US)

(72) Inventors: Todd L. Johnson, Minneapolis, MN (US); Daniel L. MacDonald, Long Lake, MN (US); Ronald A. Flor, Anoka, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 639 days.

(21) Appl. No.: 15/101,222

(22) PCT Filed: Dec. 10, 2014

(86) PCT No.: PCT/US2014/069459
§ 371 (c)(1),
(2) Date: Jun. 2, 2016

(87) PCT Pub. No.: WO2015/089134
PCT Pub. Date: Jun. 18, 2015

(65) Prior Publication Data
US 2016/0305410 A1 Oct. 20, 2016

Related U.S. Application Data

(60) Provisional application No. 61/915,874, filed on Dec. 13, 2013.

(51) Int. Cl.
*F04B 43/02* (2006.01)
*F04B 23/06* (2006.01)
(Continued)

(52) U.S. Cl.
CPC ........... *F04B 43/026* (2013.01); *F04B 9/131* (2013.01); *F04B 9/133* (2013.01); *F04B 23/06* (2013.01);
(Continued)

(58) Field of Classification Search
CPC .... F16K 3/08–085; F16K 27/045; F04B 9/12; F04B 9/129; F04B 9/131;
(Continued)

(56) References Cited

U.S. PATENT DOCUMENTS 3,070,030 A 12/1962 Mashinter
3,398,691 A 8/1968 Sato et al.
(Continued)

FOREIGN PATENT DOCUMENTS

CN 1423051 A 6/2003
CN 1842652 A 10/2006
(Continued)

OTHER PUBLICATIONS

Office Action for Chinese Application No. 201480062578.8, dated Feb. 4, 2017, 7 pages.
(Continued)

*Primary Examiner* — Alexander B Comley
(74) *Attorney, Agent, or Firm* — Kinney & Lange, P.A.

(57) ABSTRACT

A positive displacement pump includes two fluid flow paths, two center sections with a common fluid valve, a changeover valve, and three fluid displacement members. Each center section contains a diaphragm shaft, and the two sections are separated by the third diaphragm. In low-pressure mode the pump operates as a typical positive displacement pump with pumping fluid supplied to one center section and the changeover valve allowing the fluid to freely circulate within the second center section. In high-pressure mode, the changeover valve is switched and the changeover valve allows the (Continued)

common fluid valve to supply pumping fluid to both center sections to drive the fluid displacement members therein, which generates a higher outlet fluid pressure.

19 Claims, 6 Drawing Sheets

(51) Int. Cl.

| | | |
|---|---|---|
| F04B 9/131 | (2006.01) | |
| F04B 43/073 | (2006.01) | |
| F04B 45/053 | (2006.01) | |
| F04B 49/22 | (2006.01) | |
| F04B 9/133 | (2006.01) | |
| F04B 43/00 | (2006.01) | |
| F04B 45/04 | (2006.01) | |
| F16K 3/08 | (2006.01) | |
| F16K 27/04 | (2006.01) | |
| F04B 35/00 | (2006.01) | |
| F04B 53/10 | (2006.01) | |
| F04B 53/16 | (2006.01) | |
| F04B 49/00 | (2006.01) | |

(52) U.S. Cl.
CPC ........ *F04B 43/0081* (2013.01); *F04B 43/073* (2013.01); *F04B 43/0736* (2013.01); *F04B 45/043* (2013.01); *F04B 45/0536* (2013.01); *F04B 49/22* (2013.01); *F16K 3/085* (2013.01); *F16K 27/045* (2013.01); *F04B 35/00* (2013.01); *F04B 49/00* (2013.01); *F04B 53/10* (2013.01); *F04B 53/16* (2013.01)

(58) Field of Classification Search
CPC .......... F04B 9/133; F04B 23/06; F04B 41/06; F04B 43/023–026; F04B 43/06; F04B 43/073; F04B 43/0736; F04B 45/04–043; F04B 45/053; F04B 45/0536; F04B 49/22
USPC ............. 417/306, 379, 384–404; 137/625.46
See application file for complete search history.

(56) References Cited

U.S. PATENT DOCUMENTS

| | | | |
|---|---|---|---|
| 3,405,734 A * | 10/1968 | Smit | ............. F16K 11/074 137/625.21 |
| 3,741,689 A | 6/1973 | Rupp | |
| 4,184,809 A | 1/1980 | Kelley | |
| 4,381,180 A | 4/1983 | Sell | |
| 4,381,798 A * | 5/1983 | Tobin | ............. F16K 11/074 137/625.43 |
| 4,472,115 A | 9/1984 | Rupp | |
| 4,609,330 A | 9/1986 | Fahey et al. | |
| 4,818,191 A | 4/1989 | Schlake | |
| 4,830,586 A | 5/1989 | Herter et al. | |
| 5,996,627 A | 12/1999 | Reynolds | |
| 6,129,525 A | 10/2000 | Reynolds | |
| 6,471,503 B1 * | 10/2002 | Priest | ............. B29C 45/7306 137/625.41 |
| 7,811,067 B2 | 10/2010 | Dietzsch et al. | |
| 8,382,445 B2 | 2/2013 | Roseberry | |
| 2004/0057853 A1 | 3/2004 | Ross et al. | |
| 2009/0308796 A1 | 12/2009 | Ham et al. | |

FOREIGN PATENT DOCUMENTS

| | | |
|---|---|---|
| EP | 0524820 A2 | 1/1993 |
| EP | 2133575 A1 | 12/2009 |
| JP | 56-138576 A | 10/1981 |
| WO | WO 2004027298 A1 | 4/2004 |
| WO | WO 20122042533 A2 | 4/2012 |

OTHER PUBLICATIONS

Tawainese Search Report for TW Application No. 103143122, 5 page, dated Aug. 2, 2018.
International Search Report and Written Opinion, for PCT Application No. PCT/US2014/069549, dated Apr. 3, 2015, 10 pages.
PCT International Preliminary Report on Patentability, for PCT Application No. PCT/US2014/069459, dated Jun. 23, 2016, 9 pages.
Extended European Search Report for EP Application No. 14868914.4, dated Jun. 27, 2017, 7 pages.

* cited by examiner

FIG. 4B

HIGH-PRESSURE TO LOW-PRESSURE CHANGEOVER VALVE FOR A POSITIVE DISPLACEMENT PUMP

CROSS-REFERENCE TO RELATED APPLICATION

This application claims priority to U.S. Provisional Application No. 61/915,874 filed on Dec. 13, 2013, and entitled "High Pressure AODD pump with High to Low Change Over Valve," the disclosure of which is incorporated by reference in its entirety.

BACKGROUND

This disclosure relates to positive displacement pumps, and more particularly to a high-pressure to low-pressure changeover valve for a positive displacement pump.

A standard air operated diaphragm pump (AODD) utilizes a single housing, dual diaphragms, and compressed gas to drive a process fluid through the pump. In an AODD, two fluid displacement members, typically diaphragms, are joined by a shaft, and compressed gas is the working fluid in the pump. Compressed gas is applied to one of two pumping chambers, associated with the respective diaphragms. When compressed air is applied to the first pumping chamber, the first diaphragm is deflected into the first fluid cavity, which discharges the process fluid from that fluid cavity. Simultaneously, the first diaphragm pulls the shaft, which is connected to the second diaphragm, drawing the second diaphragm in and pulling process fluid into the second fluid cavity. Delivery of compressed gas is controlled by a valve, and the valve is usually actuated mechanically by the diaphragms. Thus, one diaphragm is pulled in until it causes the actuator to toggle the valve. Toggling the valve exhausts the compressed gas from the first pumping chamber and introduces fresh compressed gas to the second pumping chamber, thus causing a reciprocating movement of the respective diaphragms. Alternatively, the first and second fluid displacement members could be pistons instead of diaphragms, and the pump would operate in the same manner.

A high-pressure AODD operates similar to a typical AODD, but it has an additional diaphragm and two additional pumping chambers. In a high-pressure AODD, a second housing is attached to the first housing, with a central diaphragm disposed between the two housings. A high-pressure AODD has four pumping chambers and three diaphragms. During a first stroke compressed gas drives the first diaphragm and the central diaphragm towards the first fluid chamber, providing twice the output pressure of a standard AODD. On the reverse stroke, compressed gas drives the second diaphragm and the central diaphragm towards the second fluid chamber.

SUMMARY

According to one embodiment of the present invention, a double displacement pump includes a first fluid cavity, a second fluid cavity, a primary pump, a secondary pump, a first fluid displacement member sealingly enclosing an end of the primary pump, a second fluid displacement member sealingly enclosing an end of the secondary pump, and a central fluid displacement member sealingly disposed between the primary pump and the secondary pump. The primary pump has a primary pumping chamber, a secondary pumping chamber, a first pilot valve disposed within the first pumping chamber, and a second pilot valve disposed within the second pumping chamber. The secondary pump has a third pumping chamber and a fourth pumping chamber. A connecting rod connects the first fluid displacement member, the second fluid displacement member, and the central fluid displacement member. A primary air inlet is mounted to the primary pump, and a secondary air inlet is mounted to the secondary pump. A changeover valve is attached to the primary air inlet. The changeover valve prevents pumping fluid from flowing to the third pumping chamber and the fourth pumping chamber when the double displacement pump is in a low-pressure mode, and the changeover valve allows pumping fluid to flow to third pumping chamber and the fourth pumping chamber when the double displacement pump is in a high-pressure mode.

According to another embodiment of the present invention, a changeover valve includes a housing, a first manifold opening through the housing, a second manifold opening through the housing, and a changeover disk disposed within the housing. The changeover disk includes a first face, a second face, a first fluid flowpath extending between the first face and the second face, and a second fluid flowpath blocking flow between the first face and the second face.

DETAILED DESCRIPTION

Figure 1:
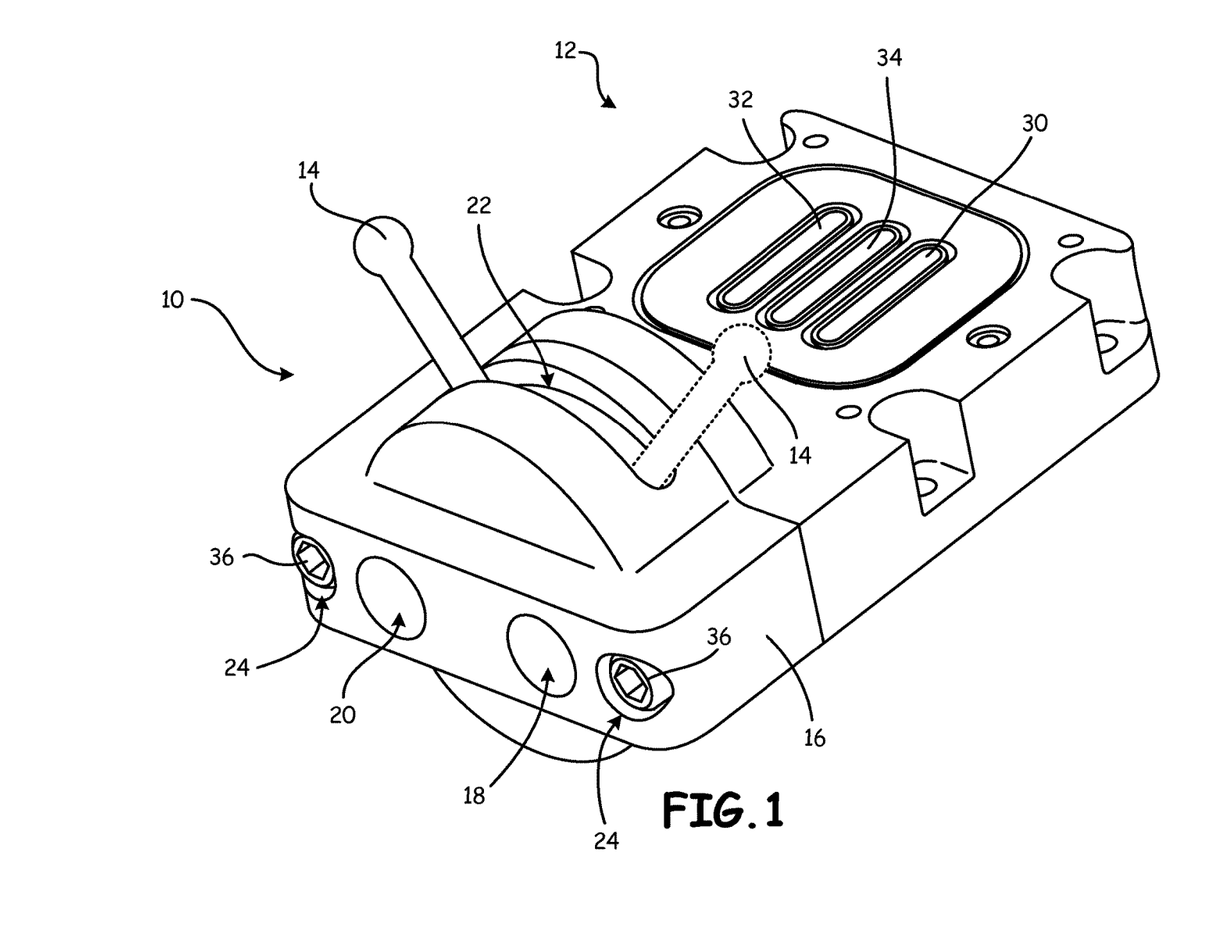
FIG. 1 is a perspective view of a changeover valve.

FIG. 1 shows a perspective view of changeover valve 10, primary manifold 12, and handle 14. Changeover valve 10 includes housing 16, first manifold opening 18, second manifold opening 20, slot 22, and openings 24. Primary manifold 12 includes first slot 30, second slot 32, and exhaust slot 34.

Changeover valve 10 is secured to primary manifold 12 by bolts 36 extending through openings 24 in housing 16 and into primary manifold 12. Handle 14 extends through slot 22 and engages changeover disk 38 (best seen in FIG. 2). When handle 14 is in a first position, as shown, changeover disk 38 prevents compressed air from flowing from primary manifold 12 through either first manifold opening 18 or second manifold opening 20, thus keeping the pump in a low-pressure mode. To switch changeover valve 10 from a low-pressure position to a high-pressure position, handle 14 is slid along slot 22 to second position (shown in dashed lines). In the second position, changeover disk 38 is aligned such that changeover disk 38 allows compressed air to flow from primary manifold 12 through first manifold opening 18 and second manifold opening 20.

Figure 2A:
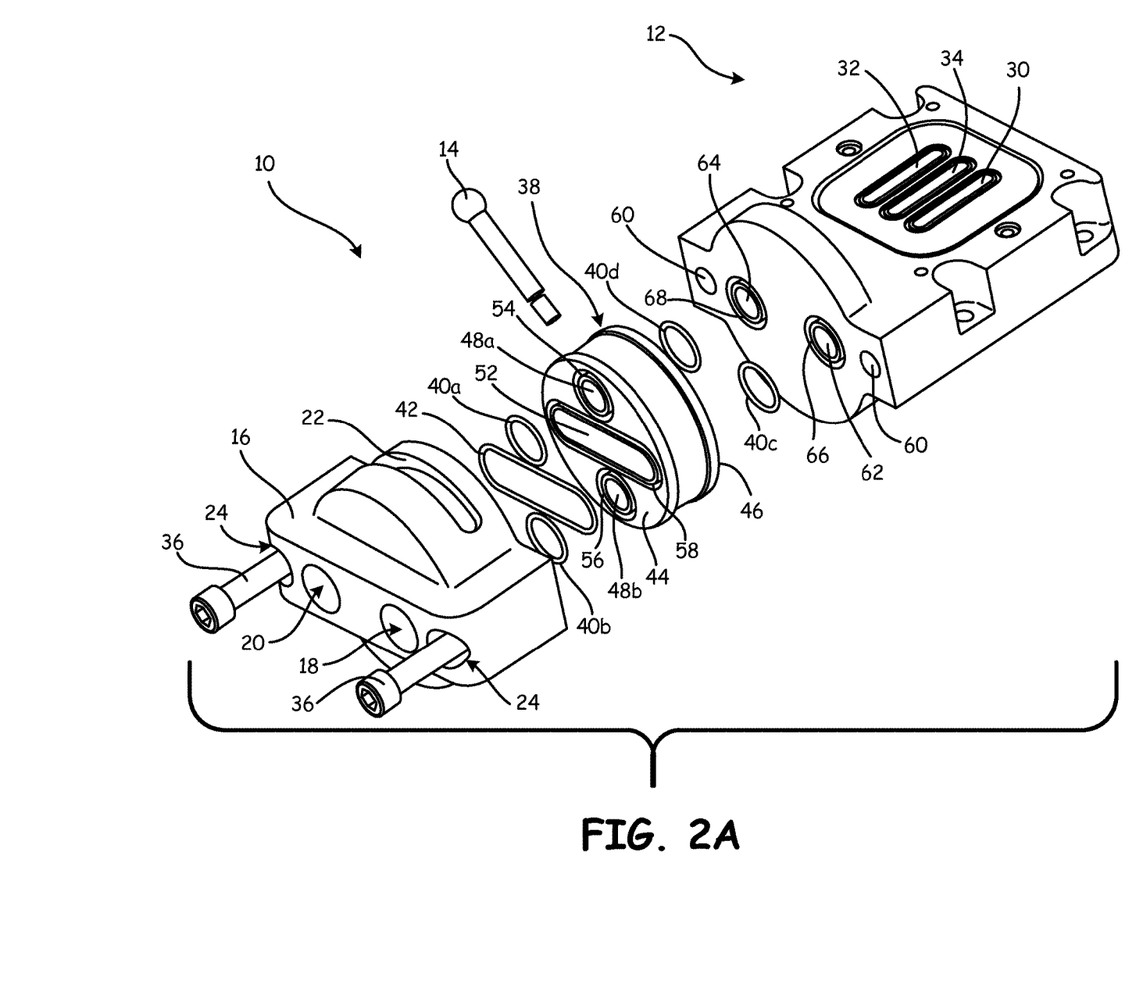
FIG. 2A is an exploded view of a changeover valve in a low-pressure position.
Figure 2B:
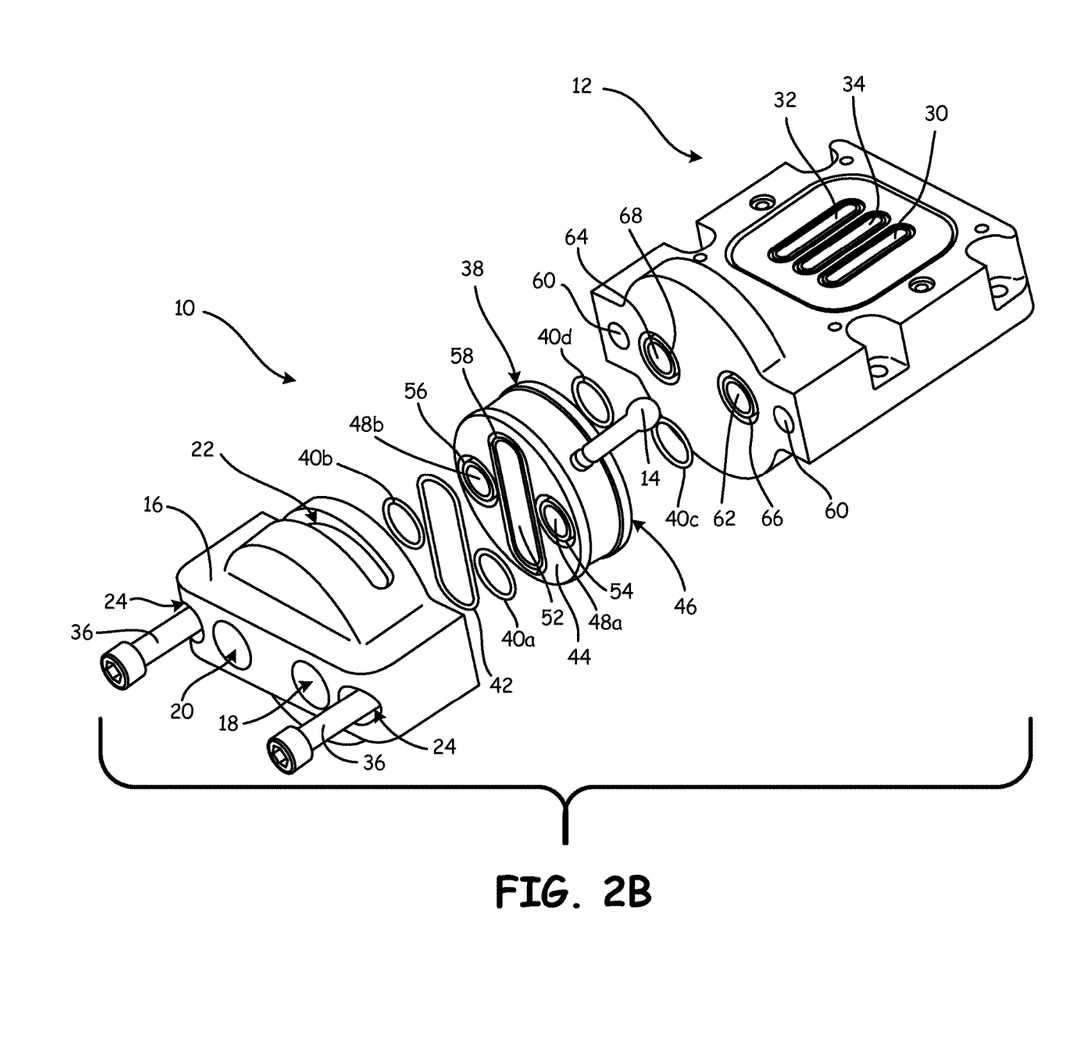
FIG. 2B is an exploded view of a changeover valve in a high-pressure position.

FIG. 2A is an exploded perspective view of changeover valve 10, primary manifold 12, and handle 14 with changeover valve 10 in a low-pressure position. FIG. 2B is an exploded perspective view of changeover valve 10, primary manifold 12 and handle 14 with changeover valve 10 in a high-pressure position. FIGS. 2A and 2B will be discussed together. Changeover valve 10 includes housing 16, first manifold opening 18, second manifold opening 20, slot 22, openings 24, changeover disk 38, o-rings 40a, 40b, 40c, and 40d, and o-ring 42. Changeover disk 38 includes first face 44, second face 46, two high-pressure flowpaths 48a and 48b extending from first face 44 to second face 46, and circulatory flowpath 52 within first face 44. Changeover disk 38 also includes grooves 54 disposed on first face 44 around the circumference of both high-pressure flowpaths 48a and 48b. Additionally, changeover disk includes groove 58 disposed around circulatory flowpath 52.

Primary manifold 12 includes bolt holes 60, first high-pressure port 62, and second high-pressure port 64. Primary manifold 12 also includes groove 66 disposed around the circumference of high-pressure port 62, and groove 68 disposed around the circumference of second high-pressure port 64. Primary manifold 12 includes first slot 30, second slot 32, and exhaust slot 34.

Changeover valve 10 is secured to primary manifold 12 by bolts 36 extending through openings 24 and into bolt holes 60. Changeover disk 38 is rotatably disposed within housing 16 with second face 46 adjacent primary manifold 12. O-ring 40a is seated within groove 54. O-ring 40b is seated within groove 56. O-ring 42 is seated within groove 58. Additionally o-ring 40c is seated within groove 66 and o-ring 40d is seated within groove 68. Handle 14 extends through slot 22 and engages changeover disk 38.

Changeover valve 10 allows double displacement pump 70 (shown in FIG. 3) to selectively operate in either a low-pressure mode or a high-pressure mode. Referring specifically to FIG. 2A, in the low-pressure mode circulatory flowpath 52 is aligned with first manifold opening 18 and second manifold opening 20. In the low-pressure mode, changeover disk 38 prevents pumping fluid from being pumped from first high-pressure port 62 through first manifold opening 18. Changeover disk 38 also prevents pumping fluid from being pumped form second high-pressure port 64 through second manifold opening 20.

Referring specifically to FIG. 2B, changeover disk 38 is shown in the high-pressure mode. To switch from low-pressure mode to high-pressure mode, handle 14 is moved along slot 22 and rotates changeover disk 38 to a high-pressure position. In the high-pressure position, changeover disk 38 is arranged such that high-pressure flowpath 48a is aligned with first high-pressure port 62 and first manifold opening 18. In this way, high-pressure flowpath 48a provides a flowpath through which pumping fluid can be pumped from primary manifold 12 through first manifold opening 18. Similarly, high-pressure flowpath 48b is aligned with second high-pressure port 64 and second manifold opening 20. Thus, high-pressure flowpath 48b also provides a flowpath through which pumping fluid can be pumped from primary manifold 12 through second manifold opening 20.

Figure 3:
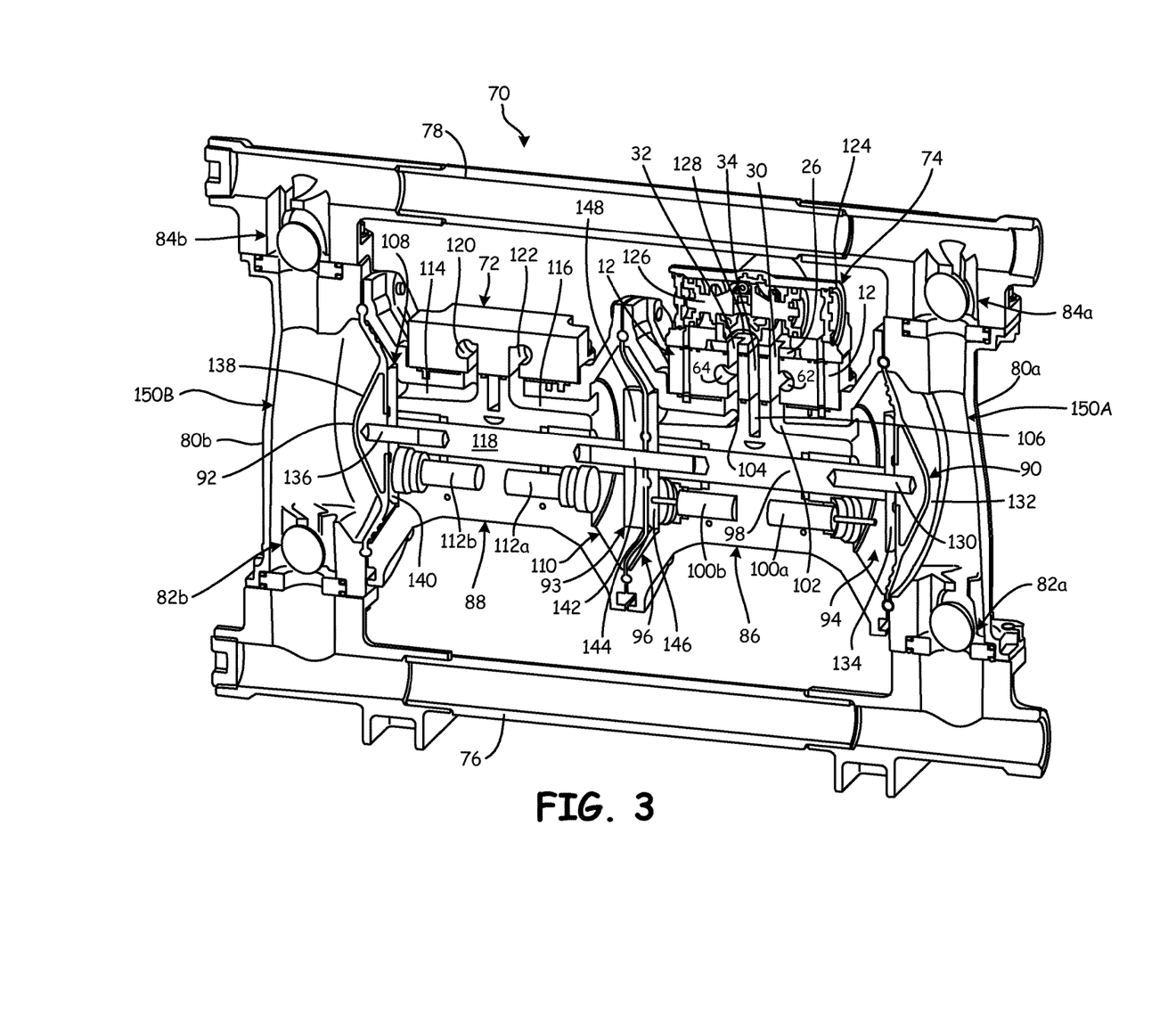
FIG. 3 is a cross-sectional view of a high pressure positive displacement pump.

FIG. 3 is a cross-sectional view of high pressure positive displacement pump 70, primary manifold 12, secondary manifold 72, and fluid valve 74. High pressure positive displacement pump 70 includes inlet manifold 76, outlet manifold 78, fluid covers 80a and 80b, inlet check valves 82a and 82b, outlet check valves 84a and 84b, primary pump 86 and secondary pump 88, first fluid displacement member 90, second fluid displacement member 92, and central fluid displacement member 93. Primary pump 86 includes first pumping chamber 94, second pumping chamber 96, primary connecting rod 98, pilot valves 100a and 100b, first pumping fluid flowpath 102, second pumping fluid flowpath 104, and exhaust flowpath 106. Secondary pump 88 includes third pumping chamber 108, fourth pumping chamber 110, plugs 112a and 112b, third pumping fluid flowpath 114, fourth pumping fluid flowpath 116, and secondary connecting rod 118.

Primary manifold 12 includes first high-pressure port 62, second high-pressure port 64, first pumping fluid flowpath 102, second pumping fluid flowpath 104, and exhaust flowpath 106. Valve plate 26 includes first slot 30, second slot 32, and exhaust slot 34. Secondary manifold 72 includes third pumping fluid flowpath 114, fourth pumping fluid flowpath 116, third high-pressure port 120, and fourth high-pressure port 122. Fluid valve 74 includes housing 124, piston 126, valve plate 26, and cup 128.

First fluid displacement member 90 includes first set screw 130, first diaphragm 132, and first diaphragm plate 134. Second fluid displacement member 92 includes second set screw 136, second diaphragm 138, and second diaphragm plate 140. Central fluid displacement member 93, includes third set screw 142, central diaphragm 144, third diaphragm plate 146, and fourth diaphragm plate 148.

Inlet manifold 76 is attached to fluid cover 80a and fluid cover 80b. Inlet check valve 82a is disposed between inlet manifold 76 and fluid cover 80a, and inlet check valve 82b is disposed between inlet manifold 76 and fluid cover 80b. Similarly, outlet manifold 78 is attached to fluid cover 80a and fluid cover 80b. Outlet check valve 84a is disposed between outlet manifold 78 and fluid cover 80a, and outlet check valve 84b is disposed between outlet manifold 78 and fluid cover 80b. First fluid displacement member 90 is disposed between fluid cover 80a and primary pump 86. First fluid displacement member 90 and fluid cover 80a define fluid cavity 150a. First fluid displacement member 90 sealingly encloses first pumping chamber 94. Second fluid displacement member 92 is disposed between fluid cover 80b and secondary pump 88. Second fluid displacement member 92 and fluid cover 80b define fluid cavity 150b. Second fluid displacement 92 sealingly encloses third pumping chamber 108. Primary pump 86 is attached to secondary pump 88 with central fluid displacement member 93 disposed between primary pump 86 and secondary pump 88. Central fluid displacement member 93 sealingly separates second pumping chamber 96 and fourth pumping chamber 110.

Primary manifold 12 is attached to primary pump 86. Housing 124 is mounted to primary manifold 12. Secondary manifold 72 is attached to secondary pump 88. Valve plate 26 is disposed on primary manifold 12 and between housing 124 and primary manifold 12. Valve plate 26 is disposed such that first slot 30 is aligned with first pumping fluid flowpath 102, second slot 32 is aligned with second pumping fluid flowpath 104, and exhaust slot 34 is aligned with exhaust flowpath 106. First pumping fluid flowpath 102 extends through primary pump 86 and primary manifold 12 such that first pumping chamber 94 is in fluid communication with fluid valve 74. Similarly, second pumping fluid flowpath 104 extends through primary pump 86 and primary manifold 12 such that second pumping chamber 96 is in fluid communication with fluid valve 74.

Piston 126 is slidingly disposed within housing 124. Cup 128 is attached to piston 126, and cup 128 is adjacent to valve plate 26. As piston 126 reciprocates within housing 124, cup 128 slides along valve plate 26. Cup 128 provides a connection between either first pumping fluid flowpath 102 or second pumping fluid flowpath 104 and exhaust flowpath 106. Fluid valve 74 allows pumping fluid to alternatingly flow through first pumping fluid flowpath 102 and first high-pressure port 62 or second pumping fluid flowpath 104 and second high-pressure port 64.

Diaphragm 132 sealingly separates first pumping chamber 94 from a process fluid flowing through pump 70. First diaphragm plate 134 is disposed on first diaphragm 132 and within first pumping chamber 94. First set screw 130 extends through first diaphragm plate 134 and into diaphragm 132, and first set screw 130 is attached to primary connecting rod 98. Similarly, second diaphragm 138 sealingly separates third pumping chamber 108 from a process fluid flowing through pump 70. Second diaphragm plate 140 is disposed on diaphragm 138 facing second pumping chamber 108. Second set screw 136 extends through second diaphragm plate 140 and into second diaphragm 138, and second set screw 136 is attached to secondary connecting rod 118. Central diaphragm 144 sealingly separates second pumping chamber 96 and fourth pumping chamber 110. Third diaphragm plate 146 is disposed on central diaphragm 144 and within second pumping chamber 96. Fourth diaphragm plate 148 is disposed on central diaphragm 144 within fourth pumping chamber 110. Third set screw 142 extends through third diaphragm plate 146, central diaphragm 144, and fourth diaphragm plate 148. Third set screw 142 is attached to primary connecting rod 98 and secondary connecting rod 118.

Pumping fluid, usually a compressed gas, is provided to fluid valve 74 by an external compressor (not shown). While pumping fluid is described as a compressed gas, it is understood that pumping fluid may be any fluid suitable for driving first fluid displacement member 90, second fluid displacement member 92, and central fluid displacement member 93, such as non-compressible hydraulic fluid. When pump 70 is in a low-pressure mode, pumping fluid alternatively flows through first pumping fluid flowpath 102 and charges first pumping chamber 94 and through second pumping fluid flowpath 104 and charges second pumping chamber 96. During a first stroke, first pumping chamber 94 is filled with pumping fluid, first fluid displacement member 90 is displaced into fluid cavity 150a. Displacing first fluid displacement member 90 into fluid cavity 150a decreases the volume of fluid cavity 150a, which causes process fluid to be discharged from fluid cavity 150a through outlet manifold 78. At the same time, primary connecting rod 98 pulls central fluid displacement member 93 thereby causing the volume of second pumping chamber 96 to decrease. Pumping fluid is exhausted from second pumping chamber 96 through second pumping fluid flowpath 104, cup 128, and exhaust flowpath 106. When first fluid displacement member 90 is fully displaced, third diaphragm plate 146 contacts pilot valve 100b, which causes piston 126 to reciprocate within housing 124 such that cup 128 now forms an exhaust circuit with first pumping fluid flowpath 102 and exhaust flowpath 106.

During a second stroke, second pumping chamber 96 is filled with a pumping fluid. The pumping fluid pushes central fluid displacement member 93 into fourth pumping chamber 110, and second fluid displacement member 92 is driven into fluid cavity 150b by central fluid displacement member 93 and secondary connecting rod 118. This causes fluid cavity 150b to decrease in volume, which discharges process fluid from fluid cavity 150b through outlet manifold 78.

Similar to the first stroke, primary connecting rod 98 pulls first fluid displacement member 90 into first pumping chamber 94 thereby simultaneously decreasing the volume of first pumping chamber 94 and increasing the volume of fluid cavity 150a. Decreasing the volume of first pumping chamber 94 exhausts pumping fluid from first pumping chamber 94 through first pumping fluid flowpath 102, cup 128, and exhaust flowpath 106. Increasing the volume of fluid cavity 150a draws process fluid into fluid cavity 150a from inlet manifold 76. When central fluid displacement member 93 is fully displaced, first diaphragm plate 134 contacts pilot valve 100a, which causes piston 126 to reciprocate within housing 124 such that cup 128 now forms an exhaust circuit with second pumping flowpath 104 and exhaust flowpath 106.

Figure 4A:
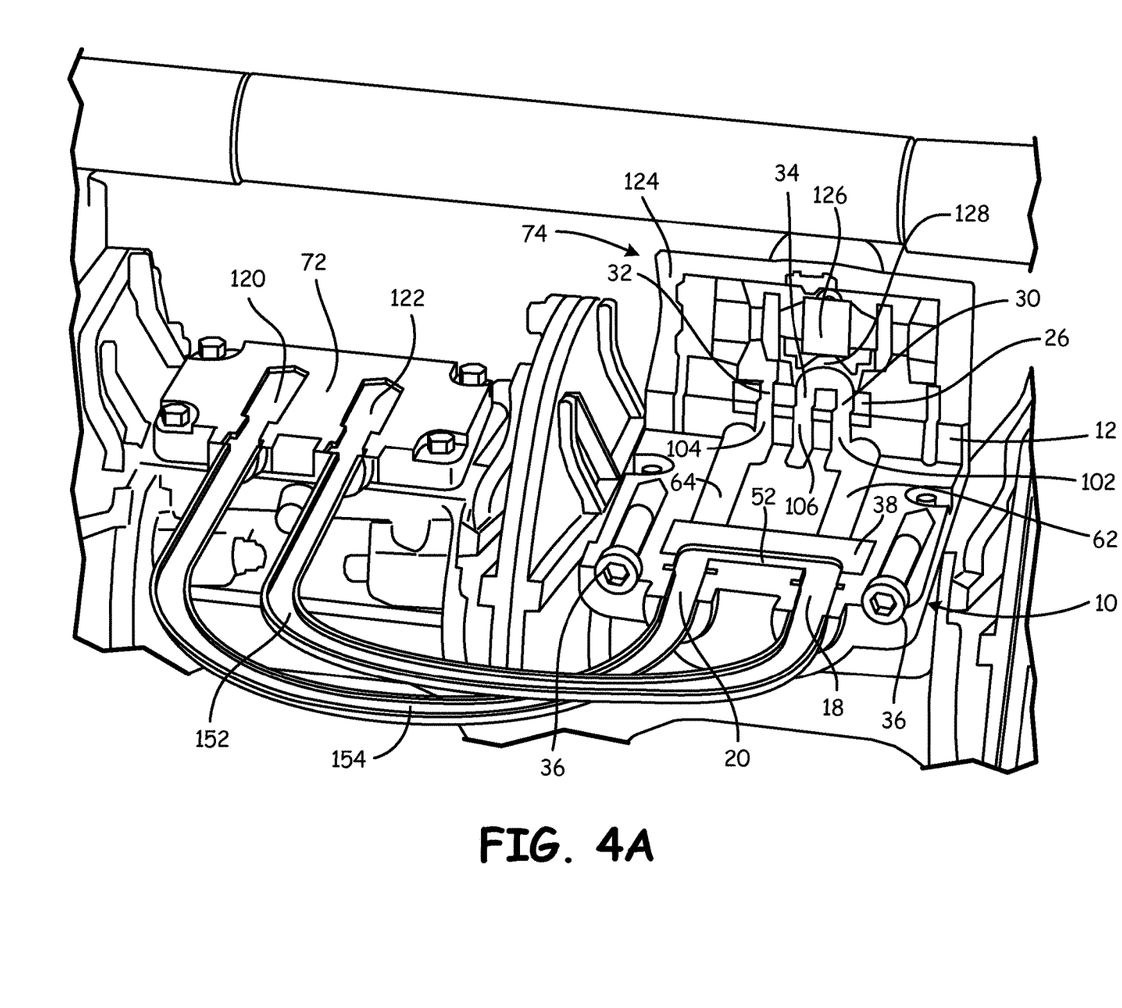
FIG. 4A is a cross-sectional view of a high pressure positive displacement pump and changeover valve, with the positive displacement pump in a low-pressure mode.
Figure 4B:
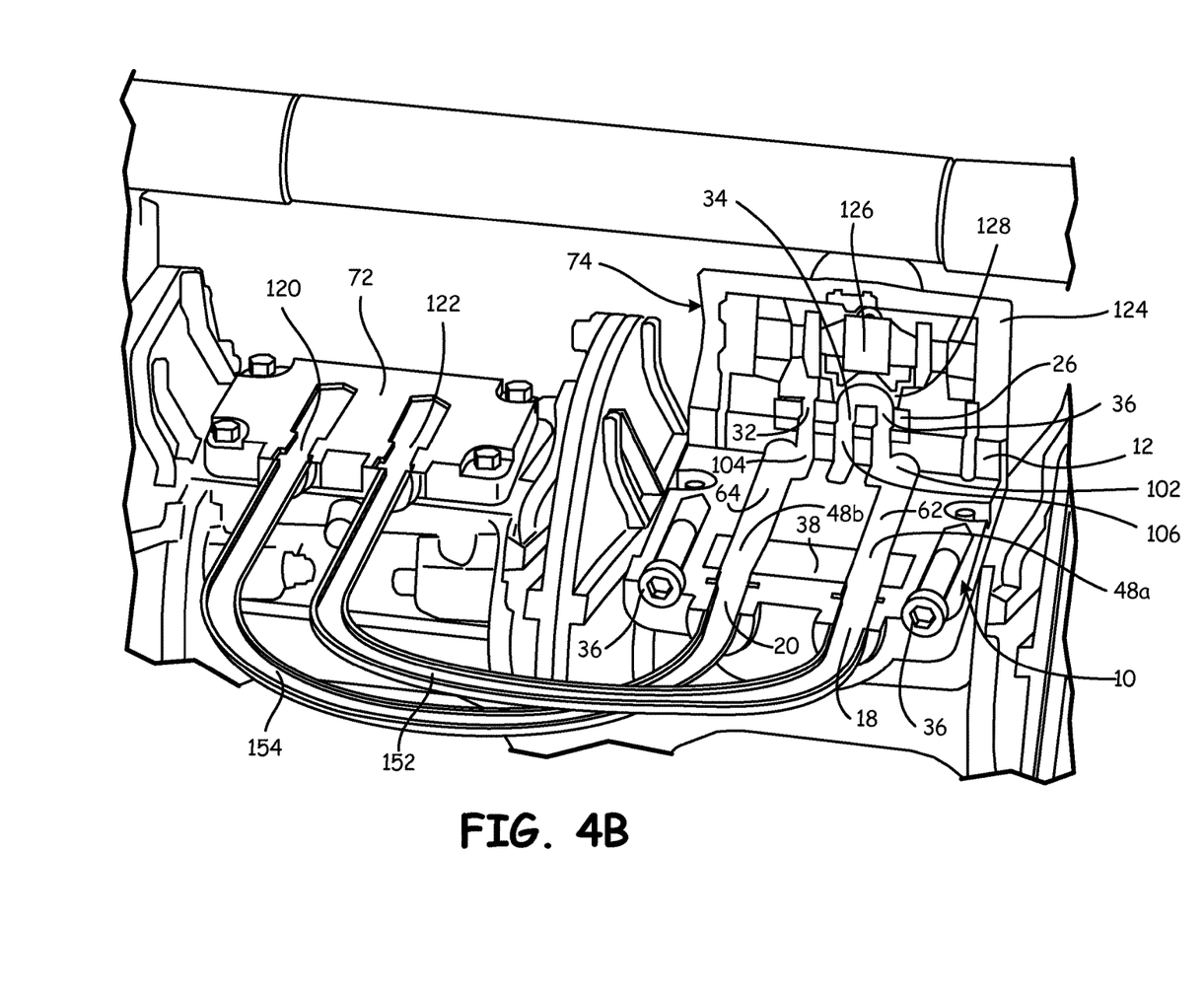
FIG. 4B is a cross-sectional view of a high pressure positive displacement pump and changeover valve, with the positive displacement pump in a high-pressure mode.

FIG. 4A is a cross-sectional view of changeover valve 10, primary manifold 12, secondary manifold 72, fluid valve 74, first pumping fluid manifold 152, and second pumping fluid manifold 154 with changeover valve 10 in a low-pressure position. FIG. 4B is a cross-sectional view of changeover valve 10, primary manifold 12, secondary manifold 72, fluid valve 74, first pumping fluid manifold 152, and second pumping fluid manifold 154 with changeover valve 10 in a high-pressure position. FIG. 4A and FIG. 4B will be discussed together. Changeover valve 10 includes housing 16, first manifold opening 18, second manifold opening 20, openings 24, and changeover disk 38. Changeover disk 38 includes first face 44, second face 46, high-pressure flowpaths 48a and 48b extending from first face 44 to second face 46, and circulatory flowpath 52 within first face 44.

Primary manifold 12 includes bolt holes 60, first high-pressure port 62, second high-pressure port 64, first pumping fluid flowpath 102, second pumping fluid flowpath 104, and exhaust flowpath 106. Valve plate 26 includes first slot 30, second slot 32, and exhaust slot 34. Secondary manifold 72 includes third high-pressure port 120 and fourth high-pressure port 122. Fluid valve 74 includes housing 124, piston 126, valve plate 26, and cup 128.

Changeover valve 10 is mounted to primary manifold 12 by bolts 36 extending through openings 24 and into bolt holes 60. Changeover disk 38 is rotatably disposed within housing 16 with second face 46 adjacent primary manifold 12. First pumping fluid manifold 152 is attached to first manifold opening 18 and fourth high-pressure port 122. Second pumping fluid manifold 154 is attached to second manifold opening 20 and third high-pressure port 120.

Primary manifold 12 is attached to primary pump 86. Housing 124 of fluid valve 74 is mounted to primary manifold 12. Secondary manifold 72 is attached to secondary pump 88. Valve plate 26 is disposed on primary manifold 12 and between housing 124 and primary manifold 12. Valve plate 26 is disposed such that first slot 30 is aligned with first pumping fluid flowpath 102, second slot 32 is aligned with second pumping fluid flowpath 104, and exhaust slot 34 is aligned with exhaust flowpath 106.

Piston 126 is slidingly disposed within housing 124. Cup 128 is attached to piston 126, and cup 128 is adjacent to valve plate 26. As piston 126 reciprocates within housing 124, cup 128 slides along valve plate 26. Cup 128 provides a connection between either first pumping fluid flowpath 102 or second pumping fluid flowpath 104 and exhaust flowpath 106. Fluid valve 74 allows pumping fluid to alternatingly flow through first pumping fluid flowpath 102 and first high-pressure port 62 or second pumping fluid flowpath 104 and second high-pressure port 64.

Referring specifically to FIG. 4A, when changeover valve is in a low-pressure position, circulatory flowpath 52 is in fluid communication with both first manifold opening 18 and second manifold opening 20. Additionally, second face 46 sealingly covers both first high-pressure port 54 and second high-pressure port 56. As described above, in a low-pressure mode, pumping fluid alternatively flows through first pumping fluid flowpath 102 and charges first pumping chamber 94 (shown in FIG. 3) and through second pumping fluid flowpath 104 and charges second pumping chamber 96 (shown in FIG. 3). During the low-pressure mode, when first pumping chamber 94 is charged, primary connecting rod 98 (shown in FIG. 3) pulls central fluid displacement member 93 (shown in FIG. 3) into second pumping chamber 96, and secondary connecting rod 118 (shown in FIG. 3) pulls second fluid displacement member 92 (shown in FIG. 3) into third pumping chamber 108 (shown in FIG. 3). When the volume of third pumping chamber 108 decreases, any pumping fluid contained in third pumping chamber 108 flows through second pumping fluid manifold 154, through circulatory flowpath 52, through first pumping fluid manifold 152, and into fourth pumping chamber 110 (shown in FIG. 3).

On the reverse stroke, second pumping chamber 96 is charged, and the pumping fluid pushed central fluid displacement member 93 into fourth pumping chamber 110, and secondary connecting rod thereby pushes second fluid displacement member 92 into fluid cavity 150b, thereby decreasing the volume of fourth pumping chamber 110 and increasing the volume of third pumping chamber 93. During this stroke, pumping fluid contained in fourth pumping chamber 110 flows through first pumping fluid manifold 152, through circulatory flowpath 52, through second pumping fluid manifold 154, and into third pumping chamber 108.

While pump 70 is in a low-pressure mode, no process fluid is being provided to third pumping chamber 108 or fourth pumping chamber 110. During the low-pressure mode, any pumping fluid contained in secondary pump 88 circulates between third pumping chamber 108 and fourth pumping chamber 110 through first pumping fluid manifold 152, second pumping fluid manifold 154, and circulatory flowpath 52.

Referring specifically to FIG. 4B, when changeover valve 10 is rotated to a high-pressure position, high-pressure flowpath 48a is aligned with first high-pressure port 62 and first manifold opening 18, and high-pressure flowpath 48b is aligned with second high-pressure port 64 and second manifold opening 20. In a high-pressure mode, pumping fluid flows through first pumping fluid flowpath 102 and first pumping fluid manifold 152 to charge both first pumping chamber 94 and fourth pumping chamber 110. First pumping chamber 94 is charged by the pumping fluid flowing though first pumping fluid flowpath 102, and fourth pressure chamber 110 is charged by the pumping fluid flowing to fourth pressure chamber 110 through first high-pressure port 62, high-pressure flowpath 48a, first manifold opening 18, first pumping fluid manifold 152, and fourth high-pressure port 122.

Pumping fluid is exhausted from third pumping chamber 108 via third high-pressure port 120, second pumping fluid manifold 154, second manifold opening 20, second high-pressure flowpath 48b, second high-pressure port 64, second pumping fluid flowpath 104, cup 128, and exhaust flowpath 106. Simultaneously, pumping fluid is also exhausted from second pumping chamber 96 through second pumping fluid flowpath 104, cup 128, and exhaust flowpath 106.

Similar to the low-pressure mode, the stroke changes over when first fluid displacement member 90 is fully displaced. When first fluid displacement member 90 is fully displaced, third diaphragm plate 144 contacts pilot valve 100b, which causes piston 126 to reciprocate within housing 124 such that cup 128 now operatively connects first pumping fluid flowpath 102 and exhaust flowpath 106.

The changeover valve 10 described herein provides several advantages. Changeover valve 10 allows pump 70 to operate in a low-pressure mode, which gives the pump a standard 1:1 outlet pressure to inlet pressure ratio. When the changeover valve 10 is shifted to a high-pressure position, the outlet pressure to inlet pressure ratio becomes 2:1. The ability to change from low-pressure mode to high-pressure mode enables the user to run the pump 70 at the low-pressure setting which gives the benefits of lower pumping fluid consumption. The changeover valve 10 allows the user to switch to a high-pressure mode by shifting a single valve when applications demand increased fluid pressure. The high-pressure mode allows for process fluid pressures higher than available inlet fluid pressures.

Although the present invention has been described with reference to preferred embodiments, workers skilled in the art will recognize that changes may be made in form and detail without departing from the spirit and scope of the invention.

The invention claimed is:

1. An air operated diaphragm pump comprising:
   a first fluid cavity;
   a second fluid cavity;
   a primary pump comprising:
      a first pumping chamber; and
      a second pumping chamber;
   a secondary pump comprising:
      a third pumping chamber; and
      a fourth pumping chamber;
   a first fluid displacement member sealingly disposed between the first fluid cavity and the first pumping chamber;
   a second fluid displacement member sealingly disposed between the second fluid cavity and the third pumping chamber;
   a central fluid displacement member sealingly disposed between the second pumping chamber and the fourth pumping chamber;
   a connecting rod connecting the first fluid displacement member, second fluid displacement member, and central fluid displacement member;
   a primary manifold mounted to the primary pump;
   a secondary manifold mounted to the secondary pump;
   an air valve mounted to the primary manifold; and
   a changeover valve comprising:
      a housing having a first manifold opening and a second manifold opening;
      a changeover disk disposed in the housing and having a first high-pressure flowpath and a second high-pressure flowpath extending between a first face of the disk and a second face of the disk;
   wherein the housing is attached to the primary manifold;
   wherein the first manifold opening and the second manifold opening of the housing are fluidly connected to the secondary manifold;
   wherein the changeover disk prevents compressed fluid from flowing to the third pumping chamber and the fourth pumping chamber during a low-pressure mode; and
   wherein the first high-pressure flowpath and the second high-pressure flowpath allow compressed fluid to flow to the third pumping chamber and the fourth pumping chamber, respectively, during a high-pressure mode.

2. The air operated diaphragm pump of claim 1, wherein the first fluid displacement member comprises a diaphragm, the second fluid displacement member comprises a diaphragm, and the central fluid displacement member comprises a diaphragm.

3. The air operated diaphragm pump of claim 1, wherein the changeover valve further comprises:
a circulatory flowpath disposed within the second face, wherein the circulatory flowpath allows fluid to circulate between the third pumping chamber and the fourth pumping chamber during the low-pressure mode.

4. The air operated diaphragm pump of claim 3, wherein the changeover valve comprises a manual changeover valve.

5. The air operated diaphragm pump of claim 4, further comprising:
a handle extending through the housing and connected to the changeover disk.

6. The air operated diaphragm pump of claim 1, wherein the changeover valve is an automatic changeover valve.

7. The air operated diaphragm pump of claim 6, further comprising:
a pressure transducer downstream of the pump for sensing a fluid pressure, wherein the pressure transducer signals the automatic changeover valve to switch from the low-pressure mode to the high-pressure mode.

8. The air operated diaphragm pump of claim 1, wherein the connecting rod further comprises:
a first shaft connecting the first diaphragm and the third diaphragm; and
a second shaft connecting the second diaphragm and the third diaphragm.

9. A changeover assembly for an air operated diaphragm pump, the changeover assembly comprising:
a primary manifold having a first high-pressure port extending into the primary manifold, a second high-pressure port extending into the primary manifold, a first pumping flowpath in fluid communication with the first high-pressure port and configured to provide fluid to a first pumping chamber, and a second pumping flowpath in fluid communication with the second high-pressure port and configured to provide fluid to a second pumping chamber;
a housing including a first manifold opening through the housing and a second manifold opening through the housing;
a changeover member disposed within the housing and movable between a high-pressure position and a low-pressure position, the changeover member defining a first high-pressure flowpath extending through the housing and a second high-pressure flowpath extending through the housing;
wherein in the high-pressure position, the first high-pressure flowpath fluidly connects the first high-pressure port and the first manifold opening, and the second high-pressure flowpath fluidly connects the second high-pressure port and the second manifold opening; and
wherein in the low-pressure position, the changeover member fluidly disconnects the first high-pressure port from the first manifold opening and fluidly disconnects the second high-pressure port from the second manifold opening.

10. The changeover assembly of claim 9, wherein the changeover member includes a changeover disk having a first face and a second face, the first high-pressure flowpath and the second high-pressure flowpath extending between the first face and the second face, and the disk further comprises a circulatory flowpath disposed in the first face.

11. The changeover assembly of claim 10, further comprising: a handle extending through the housing and connected to the changeover disk.

12. The changeover assembly of claim 9, further comprising: a plurality of fasteners extending through the housing into the primary manifold to connect the housing to the primary manifold.

13. The changeover assembly of claim 12, wherein the plurality of fasteners extend parallel to the first high-pressure flowpath and the second high-pressure flowpath.

14. The changeover assembly of claim 9, wherein the changeover member comprises a changeover disk having a first face and a second face, wherein the first high-pressure flowpath and the second high-pressure flowpath extend through the disk between the first face and the second face.

15. The changeover assembly of claim 14, further comprising: a first port groove extending around the first high-pressure port; a second port groove extending around the second high-pressure port; a first port o-ring disposed in the first port groove, wherein the first port o-ring is configured to provide a seal between the primary manifold and the second face; and a second port o-ring disposed in the second port groove, wherein the second port o-ring is configured to provide a seal between the primary manifold and the second face.

16. The changeover assembly of claim 14, further comprising: a circulatory flowpath disposed in the first face, wherein the circulatory flowpath fluidly connects the first manifold opening and the second manifold opening with the changeover disk in the low-pressure position.

17. The changeover assembly of claim 16, further comprising: a groove extending into the first face around the circulatory flowpath; a seal disposed in the groove and configured to provide a seal between the first face and the housing; wherein the seal is configured to rotate with the changeover disk as the changeover disk transitions between the high-pressure position and the low-pressure position.

18. The changeover assembly of claim 14, further comprising: a first disk groove extending into the first face around the first high-pressure flowpath; a second disk groove extending into the first face around the second high-pressure flowpath; a first disk o-ring disposed in the first disk groove, wherein the first disk o-ring is configured to provide a seal between the first face and the housing; and a second disk o-ring disposed in the second disk groove, wherein the second disk o-ring is configured to provide a seal between the first face and the housing; wherein the first disk o-ring and the second disk o-ring rotate with the changeover disk as the changeover disk transitions between the high-pressure position and the low-pressure position.

19. A changeover valve for an air operated three diaphragm pump including a shaft alternatingly driven in a first direction and a second direction to pump fluid, the three diaphragm pump operable in a high-pressure mode, where pumping fluid is simultaneously directed to a first high-pressure pumping chamber and a first low-pressure pumping chamber to drive the shaft in the first direction and then simultaneously directed to a second high-pressure pumping chamber and a second low-pressure pumping chamber to drive the shaft in the second direction, and the three diaphragm pump is further operable in a low-pressure mode, where pumping fluid is directed to the first low-pressure pumping chamber to drive the shaft in the first direction and then directed to the second low-pressure pumping chamber to drive the shaft in the second direction, the changeover valve comprising:

a housing fluidly connected to a primary manifold to receive pumping fluid from the primary manifold, the housing including a first manifold opening fluidly connected to the first high-pressure pumping chamber and a second manifold opening fluidly connected to the second high-pressure pumping chamber; and a changeover member disposed within the housing and movable between a high-pressure position associated with the high-pressure mode and a low-pressure position associated with the low-pressure mode;

wherein in the high-pressure position the changeover member fluidly connects a first high-pressure port through the primary manifold with the first manifold opening such that the pumping fluid can flow to the first high-pressure pumping chamber, and further fluidly connects a second high-pressure port through the primary manifold with the second manifold opening such that the pumping fluid can flow to the second high-pressure pumping chamber; and wherein in the low-pressure position the changeover member fluidly disconnects the first high-pressure port from the first manifold opening such that the pumping fluid is prevented from flowing to the first high-pressure pumping chamber and fluidly disconnects the second high-pressure port from the second manifold opening such that the pumping fluid is prevented from flowing to the second high-pressure pumping chamber.

* * * * *

UNITED STATES PATENT AND TRADEMARK OFFICE
CERTIFICATE OF CORRECTION

PATENT NO. : 10,514,027 B2
APPLICATION NO. : 15/101222
DATED : December 24, 2019
INVENTOR(S) : Johnson et al.

Page 1 of 1

It is certified that error appears in the above-identified patent and that said Letters Patent is hereby corrected as shown below:

In the Specification

Column 4, Line 67:
Delete "altematingly"
Insert --alternatingly--

Column 6, Line 58:
Delete "altematingly"
Insert --alternatingly--

Signed and Sealed this
Twenty-fourth Day of November, 2020

Andrei Iancu
*Director of the United States Patent and Trademark Office*